May 5, 1959  G. M. McWILLIAMS  2,884,953

FOOT OPERATED DIAPHRAGM VALVE

Filed Feb. 27, 1956

*INVENTOR.*
George M. McWilliams

BY

ATTORNEY

2,884,953
FOOT OPERATED DIAPHRAGM VALVE

George M. McWilliams, New Alexandria, Pa., assignor to Westinghouse Air Brake Company, Wilmerding, Pa., a corporation of Pennsylvania Application February 27, 1956, Serial No. 567,965

1 Claim. (Cl. 137—620)

This invention relates to foot-operated valves and more particularly to foot-operated valve devices of the diaphragm type employed in so-called safety car brake equipment for railway vehicles.

In safety car equipment, a diaphragm foot valve and a hand-operated brake controller valve are provided in order to obtain the well-known deadman's brake control of the car. This deadman's control is such that if the operator's foot is removed from the foot valve pedal and his hand from the brake controller handle at the same time without a predetermined brake application, a deadman's brake application will automatically become effective to stop the car. In previous safety car control equipments such as that disclosed in Patent No. 1,895,476, patented January 31, 1933, issued to Joseph C. McCune and assigned to W. A. B. Co., the foot valve device has been of the type that required some effort on the part of the engineer to maintain the foot valve pedal depressed in one position in order to prevent an undesired brake application. With this foot valve pedal so positioned, as previously has been the custom, it becomes tiresome to the operator to maintain the foot valve pedal depressed.

The principal object of my invention is to provide an improved foot valve device, of the diaphragm type for a safety car brake control equipment, so constructed as to enable muscular strain on the operator to be avoided.

Another object of my invention is to provide an improved foot valve device of the general character indicated in the foregoing object and embodying novel structure for enabling movement of the foot valve pedal beyond that required to effect operation of the foot valve device.

These objects and other objects and advantages will become apparent from the following detailed description of the invention and from the accompanying drawings wherein.

Description

Figure 1:
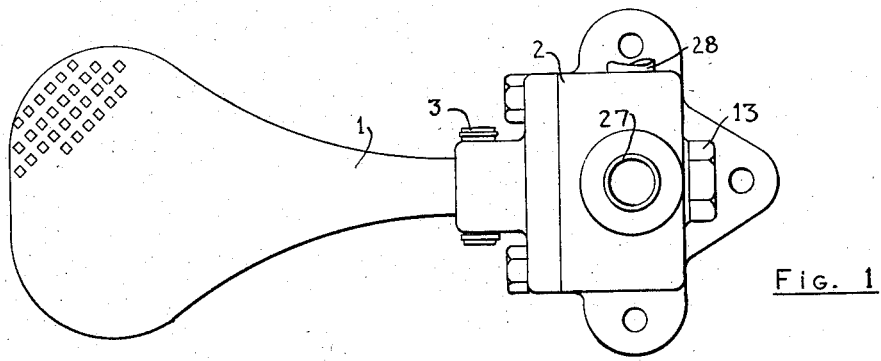
Fig. 1 is a plan view, shown in outline, of a foot valve device.
Figure 2:
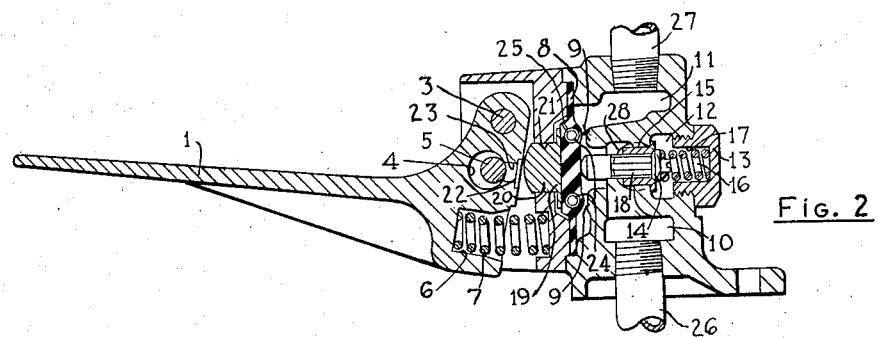
Fig. 2 is an elevational view, in section, of a foot valve device wherein an improved diaphragm valve is utilized.

As shown in Fig. 1, the foot valve device comprises a foot pedal 1 and a valve body 2. As shown in Fig. 2 the foot pedal 1 is pivotally mounted on the valve body 2 by a pivot pin 3. Secured to the valve body 2 and extending through a circular opening 4 in the foot pedal is a pin 5, the opening 4 being of greater diameter than the pin 5 so as to permit a limited movement of the foot pedal 1 relative to the pin 5. Interposed between the foot pedal 1 and the valve body 2 in a recess 6 in the pedal 1 is a coil spring 7 which biases the pedal in a clockwise direction about the pin 3 to a normal raised position determined by the engagement of pin 5 with the right-hand edge of opening 4.

Mounted within the valve body is a flexible diaphragm valve 8 so constructed as to be collapsible under predetermined pressures as will be explained in more detail hereinafter. Diaphragm valve 8 is adapted to seat on a circular seat rib 9 formed on the body 2, and positioned to control communication from a chamber 10 opening into the inside seated area of the diaphragm valve to a chamber 11 outside the seated area of the diaphragm valve. A chamber 12 is formed within the valve body and sealed by a recessed cap screw 13, said chamber 12 containing a valve 14 of the poppet type which is seated on a valve seat 15 by the biasing pressure of a coil spring 16 contained in a recess 17 in the cap screw 13. The valve 14 is provided with a fluted stem 18, the outer end of which engages the inner face of the diaphragm valve 8. Engaging the outer face of the diaphragm valve 8 is a diaphragm follower 19 having an operating stem 20 which is slidably mounted in a finished bore 21 of the valve body 2. The outer end of the operating stem 20 extends beyond the outer surface of the bore 21 and engages a contact piece 22 of suitable hard metal, such as steel, mounted securely in a recess or bore 23 extending through to the opening 4 in the foot pedal 1 such that when foot pedal 1 is depressed, that is, rotated about the pin 3 against the biasing pressure of spring 7, the piece 22 contacts the operating stem 20 to cause movement of the operating stem to the right to effect operation of the diaphragm valve 8 as explained more fully hereinafter.

The diaphragm valve 8 is of novel construction in that at the point of contact of said diaphragm and the seat rib 9 the cross section of the diaphragm is collapsible or compressible. This construction is accomplished during the process of molding the diaphragm valve by embedding between the two faces of the diaphragm valve an annular impregnated fabric tubing 24, the hollow interior of which is vented to the outside of the diaphragm valve through a breather port 25. The tubing 24 is of sufficient strength to hold the diaphragm firmly against the seat rib 9 to effect a seal without collapsing. Further movement of the foot pedal after the diaphragm valve is once seated on the seat rib 9 causes the flexible tubing to collapse without altering the seal effected between the diaphragm valve and seat rib, thus providing a limited degree of additional movement of the foot pedal, while holding the diaphragm valve in its seated position on seat rib 9.

In use, the foot valve device is operated to suppress the common safety control feature of safety car equipment when the hand-operated brake control valve is not being used. In such operation, downward pressure on the foot pedal 1 compresses the spring 7 and pivots the pedal about the pivot pin 3 such that the contact piece 22 engages the outer end of the operating stem 20 and effects movement thereof to the right to cause the normally unseated diaphragm valve 8 to be seated against the seat rib 9. The seating of diaphragm valve 8 on rib 9 closes the passage between the chamber 10 normally connected to the safety control pipe 26 in safety car control equipment and chamber 11 normally connected to atmosphere through port and pipe 27. Simultaneously with the seating of the diaphragm valve 8, the diaphragm valve contacts the valve stem 18 of valve 14 and causes said valve to be moved to the right against the biasing pressure of spring 16 to unseat valve 14 thereby establishing a connection between chamber 10 and chamber 12 normally connected to a source of fluid pressure, such as a main reservoir, through a pipe 28 (shown dotted).

This just described operation is normal operation of the standard diaphragm type foot valve, however, in the present invention the diaphragm valve 8 being of an improved collapsible type, the operator may depress the foot pedal to its lowermost position, which operation of the pedal causes the collapsible diaphragm to be collapsed or compressed axially without further operation of the foot valve device, thus giving a limited additional movement of the foot pedal 1 to relieve muscular fatigue on the operator's foot. When the foot is removed from the pedal 1, the pressure of spring 7 causes the pedal to move upward about the pivot pin 3 to permit the diaphragm valve 8 to return to its normal open position due to its inherent resilient qualities aided by the pressure of spring 16 in chamber 12 such that chambers 10 and 11 will be connected and connection between chambers 10 and 12 will be closed by the seating of valve 14.

Figure 3:
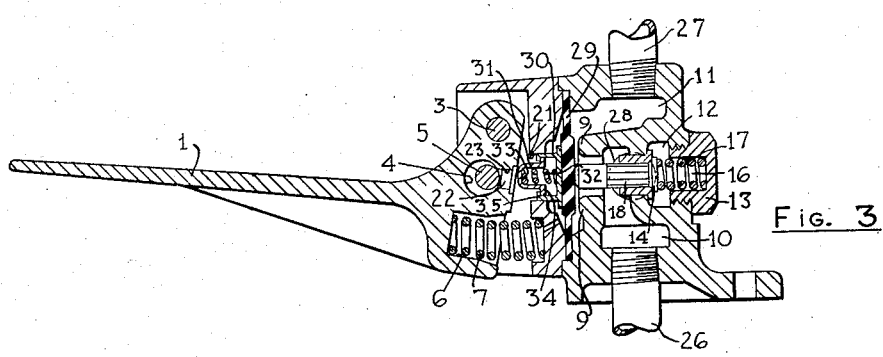
Fig. 3 is an elevational view, in section, of a foot valve device wherein a novel combined spring cage and diaphragm valve is utilized.

The embodiment shown in Fig. 3 is similar to that shown in Fig. 2, and like reference numerals designate identical parts in the two figures. The embodiment in Fig. 3 differs from that in Fig. 2 in that a non-collapsible type of diaphragm valve 29 is utilized in conjunction with a spring cage arrangement that takes the place of the diaphragm follower 19 and operating stem 20 of the embodiment of Fig. 2. The spring cage arrangement shown in Fig. 3 consists of an outer cylindrical cage 30 closed at one end which operates slidably in bore 21 of the valve body 2. Inside cage 30 is a slidable cylindrical spring follower 31, open at its inner end, within which is positioned a coil spring 32 that abuts the inside of the closed end of said outer cage 30 on one end and the inside surface 33 of the spring follower which is closed at the other end. The open end of the spring follower 31 has an outwardly extending flange 34 for engagement with an inwardly extending flange 35 on one end of the outer cage 30 when the foot pedal is in its raised position. The opposite or closed end of the outer cage 30 is outwardly flanged and positioned against the face of the diaphragm valve.

The embodiment shown in Fig. 3 operates in a manner similar to that just described for Fig. 2 with the exception that as the pedal is depressed, all of the spring cage apparatus including the outer cage 30, the cylindrical spring follower 31 and the spring 32 is moved to the right to cause the diaphragm valve 29 to be seated against the rib 9 to effect operation as previously described in connection with Fig. 2. Further movement of the pedal 1 in the downward direction will cause the cylindrical spring follower 31 to slidably move in the right-hand direction within the outer cage 30 to compress the coil spring 32 against the closed end of the outer cage 30 and thereby provide additional limited movement of the pedal 1 to its lowermost position so as to relieve muscular fatigue on the operator's foot.

It can thus be seen that I have provided an improved foot valve device for safety car control equipment such that upon normal operation of the foot valve, the proper connections are opened or closed as desired in safety control and further operation in a downward direction by the operator results in free movement without effecting operation of the valve device itself such that muscular fatigue is reduced considerably for the operator who with previous foot valve devices was required to maintain the foot pedal in one position for lengthy periods of time without movement in order to prevent an undesired brake application.

While I have illustrated and described two embodiments of my invention it is to be understood that these embodiments are capable of variation and modification and I therefore do not wish to be limited to the precise details set forth but desire to avail myself with such alterations as fall within the scope of the following claim.

Having now described the invention, what I claim as new and desire to secure by Letters Patent is:

In a foot valve device of the type utilized in safety car control equipment, in combination, a valve body, a foot pedal hingedly mounted on said valve body, said foot pedal adapted to be subject to foot-applied pressure to provide limited movement from a raised position to a lowermost position, according to the degree of foot-applied pressure, a valve seat, and a diaphragm valve means having a collapsible tubing integrally embodied therein, said diaphragm valve means mounted within said valve body and adapted to engage said valve seat upon a predetermined depression of said pedal from its raised position responsive to a predetermined foot-applied pressure, the said collapsible tubing being adapted to collapse upon further depression of said pedal to its lowermost position responsive to additional foot-applied pressure, without further seating movement of said diaphragm valve means.

References Cited in the file of this patent

UNITED STATES PATENTS

| 360,651 | Boluss | Apr. 5, 1887 |
| 1,359,521 | Mueller | Nov. 23, 1920 |
| 1,650,077 | Lamb | Nov. 22, 1927 |
| 1,714,740 | Timbs | May 28, 1929 |
| 1,895,476 | McCune | Jan. 31, 1933 |
| 2,141,070 | Newell | Dec. 20, 1938 |

FOREIGN PATENTS

| 27,009 | Great Britain | 1896 |
| 254,052 | Switzerland | 1949 |